United States Patent
Gräber et al.

(10) Patent No.: US 6,702,502 B1
(45) Date of Patent: Mar. 9, 2004

(54) BALL-AND-SOCKET JOINT

(75) Inventors: Jürgen Gräber, Dielingen (DE); Werner Stehr, Ahldorf (DE)

(73) Assignee: ZF Lemförder Metallwaren AG, Lemförde (DE)

( * ) Notice: Subject to any disclaimer, the term of this patent is extended or adjusted under 35 U.S.C. 154(b) by 8 days.

(21) Appl. No.: 09/807,561

(22) PCT Filed: Aug. 9, 2000

(86) PCT No.: PCT/DE00/02713

§ 371 (c)(1),
(2), (4) Date: Apr. 11, 2001

(87) PCT Pub. No.: WO01/13001

PCT Pub. Date: Feb. 22, 2001

(30) Foreign Application Priority Data

Aug. 13, 1999 (DE) .......................... 199 37 655

(51) Int. Cl.$^7$ ............................. F16C 11/00; F16D 1/12
(52) U.S. Cl. ............................. 403/34; 403/37; 403/38; 403/39; 403/122; 403/124; 403/132; 403/133; 384/283
(58) Field of Search ................................. 403/135, 140, 403/132, 133, 122, 139, 34, 37–39, 124; 384/213, 291, 370, 206, 279, 292, 373, 98, 283; 184/6.16

(56) References Cited

U.S. PATENT DOCUMENTS

| | | | | |
|---|---|---|---|---|
| 2,932,534 A | | 4/1960 | Williams | |
| 3,647,249 A | | 3/1972 | Baba et al. | |
| 4,105,267 A | * | 8/1978 | Mori | 384/291 |
| 4,904,106 A | * | 2/1990 | Love | 403/39 |
| 5,033,871 A | * | 7/1991 | Ide | 384/98 |
| 5,240,332 A | * | 8/1993 | Onishi et al. | 384/100 |
| 5,492,428 A | * | 2/1996 | Hellon et al. | 403/122 |
| 6,000,850 A | * | 12/1999 | Takahashi et al. | 384/114 |
| 6,059,460 A | * | 5/2000 | Ono et al. | 384/283 X |

FOREIGN PATENT DOCUMENTS

| | | |
|---|---|---|
| DE | 39 30 825 | 9/1990 |
| DE | 39 20 683 | 1/1991 |
| DE | 40 19 997 | 1/1991 |
| DE | 44 19 954 | 1/1996 |
| FR | 2 170 608 | 8/1973 |
| JP | 62270815 | 11/1987 |
| WO | WO 99/32796 | 7/1999 |

\* cited by examiner

*Primary Examiner*—Lynne H. Browne
*Assistant Examiner*—Victor MacArthur
(74) *Attorney, Agent, or Firm*—McGlew and Tuttle, P.C.

(57) ABSTRACT

A ball-and-socket joint, preferably for motor vehicles, in which a joint ball formed on a pivot pin is mounted movably in a bearing shell consisting of a plastic, is presented. The bearing shell has recesses accommodating lubricant on its inner jacket surface facing the joint ball and is itself inserted into a housing. According to the present invention, the recesses may be grooves as a structural system with groove sections or depressions of microscopic size extending obliquely in relation to the central longitudinal axis of the ball-and-socket joint. Due to this novel design, a pumping effect is achieved during movements of the joint ball over the groove sections, and this pumping effect draws the lubricant present in the groove sections into the gap between the joint ball and the bearing shell, so that improved lubrication of the ball-and-socket joint compared with the state of the art is guaranteed under all operating conditions.

15 Claims, 4 Drawing Sheets

BALL-AND-SOCKET JOINT

FIELD OF THE INVENTION

The present invention pertains to a ball-and-socket joint, preferably for motor vehicles, in which a joint ball formed on a pivot pin is mounted movably in a bearing shell consisting of a plastic, wherein the bearing shell has recesses accommodating lubricant on its inner jacket surface facing the joint ball. The bearing shell is surrounded with a housing, which accommodates it and tightly surrounds it with its inner wall.

BACKGROUND OF THE INVENTION

Such ball-and-socket joints of this type are widely used in mechanical engineering, especially in the automotive industry. The frictional losses between the parts moving in relation to one another, i.e., the joint ball and the bearing shell, is reduced by the recesses provided in the joint shell, into which a lubricant reservoir is introduced before assembly, by the lubricant flowing out of the recesses into the space between the joint ball and the bearing shell in the assembled state of the ball-and-socket joints. Even though the ball-and-socket joints described have proved to be successful in practice, there is an essential problem in the fact that the lubricating film thickness between the joint ball and the bearing shell drops to values below the surface roughness of the surfaces moving in relation to one another after prolonged states of rest of the joints. As a result of this, the smoother a pivot pin, the smaller will become the lubricating film in the bearing gap. The small lubricating film thickness leads to a very great increase in the forces necessary for separation for the movement of the joint ball in relation to the bearing shell.

The above-described drawback of prior-art ball-and-socket joints is additionally facilitated by the fact that the distance between the recesses forming the individual grease pockets is usually in the range of 3–5 mm and greater, which additionally contributes to the problem that the instantaneous, rapid flow of the lubricant back into the narrow, but very long lubricating gap may become difficult in the case of movement within the ball-and-socket joint after days or weeks. Thus, the flowing away of the lubricant from the lubricating gap, which takes place over the prolonged period of rest lasting days or weeks, cannot be compensated, so that an adhesion and suction effect develops, which allows the separation forces (breakaway torque) to increase to a value several times higher than the forces occurring during continuous movement.

SUMMARY AND OBJECTS OF THE INVENTION

The object of the present invention is therefore to provide a ball-and-socket joint of this type with improved joint lubrication, which has, in particular, uniform overturning moments and torques and whose service life is thus prolonged.

This object is accomplished according to the present invention by the recesses accommodating the lubricant being grooves, which form a structural system with groove sections extending obliquely in relation to the central longitudinal axis of the ball-and-socket joint, wherein the lateral distances between two adjacent groove sections are kept short and the depth $t$ of the groove sections is equal to or greater than the width $b$ of the groove sections.

The solution according to which the recesses in the bearing shell are grooves which form a structural system with groove sections extending obliquely in relation to the central longitudinal axis of the ball-and-socket joint, wherein the lateral distances between two adjacent groove sections are kept short and the depth $t$ of the groove sections is equal to or greater than one third of the width $b$ of the groove sections has also proved to be an advantageous solution to the object described in the introduction.

Moreover, one solution may be that the recesses in the bearing shell are depressions of microscopic size.

It is achieved, e.g., by the novel design that the segments of the elastic bearing shell which are located between the groove sections are deformed during a load change and the volume of the recesses thus changes or is reduced. The lubricant present in the recesses is squeezed out of these recesses due to the reduction and it is thus available as a lubricant in the immediate vicinity of the loaded areas. Due to the hydrostatic pressure built up as a result, the lubricant squeezed out of the recesses is distributed and thus lowers the friction in the gap between the joint ball and the bearing shell. In addition, there is an advantage in that the grooves or depressions present as a structural system on the jacket surface of the bearing shell cause the entire structure of the bearing shell to be more mobile, so that e.g., peak loads of the bearing shell caused by run-out can be better distributed and thus reduced. The effective load on the ball-and-socket joint thus may possibly even increase due to the novel design of the bearing shell of the ball-and-socket joint.

If, moreover, the recesses are made microscopically small recesses, surprising improvements can also be achieved in the lubricating properties of such ball-and-socket joints as a result. The effect achieved is, on the one hand, that the recesses closed by the joint ball surface build up a static pressure as a consequence of their grease filling, and this static pressure brings about a permanent bearing effect of the ball pivot even when the joint is not moving. The above-described hydrodynamic effect is then utilized during movements of the ball pivot in order to lower the friction between the joint ball and the bearing shell.

Another essential aspect for the effectiveness of the novel ball-and-socket joint is the fact that the depth $t$ of the groove sections is equal to or greater than the width $b$ of these sections or one third of the width $b$. A pumping effect can thus be achieved within the groove sections due to the deformation of the adjoining areas of the bearing shell.

The separation torques can be brought into line with the momentums of the ball-and-socket joint by the described features according to the present invention, so that no initial breakaway torque nor the clicking noises possibly associated with same are generated after a short or prolonged period of rest. Moreover, the tendency to the jerky sliding of the parts moving in relation to one another in such joints and consequently noise generation are reduced due to the more uniform torques during different forms of movement of the ball-and-socket joint.

Moreover, the defined surface of the bearing shell consisting of a plastic contributes to a reduction in the dispersion within the production of such ball-and-socket joints.

In ball-and-socket joints whose joint ball is deflected in different directions relative to the bearing shell, the described pumping effects of the grooves can be brought about, e.g., by the longitudinal extension of the groove sections adjoining one another being arranged essentially at right angles to one another.

Another possibility of increasing the pumping effect is achieved by the structural system of the groove sections being divided into individual structural fields, in which the groove sections are arranged in parallel to one another, whereas the groove sections of structural fields located next to one another are located at right angles to one another.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
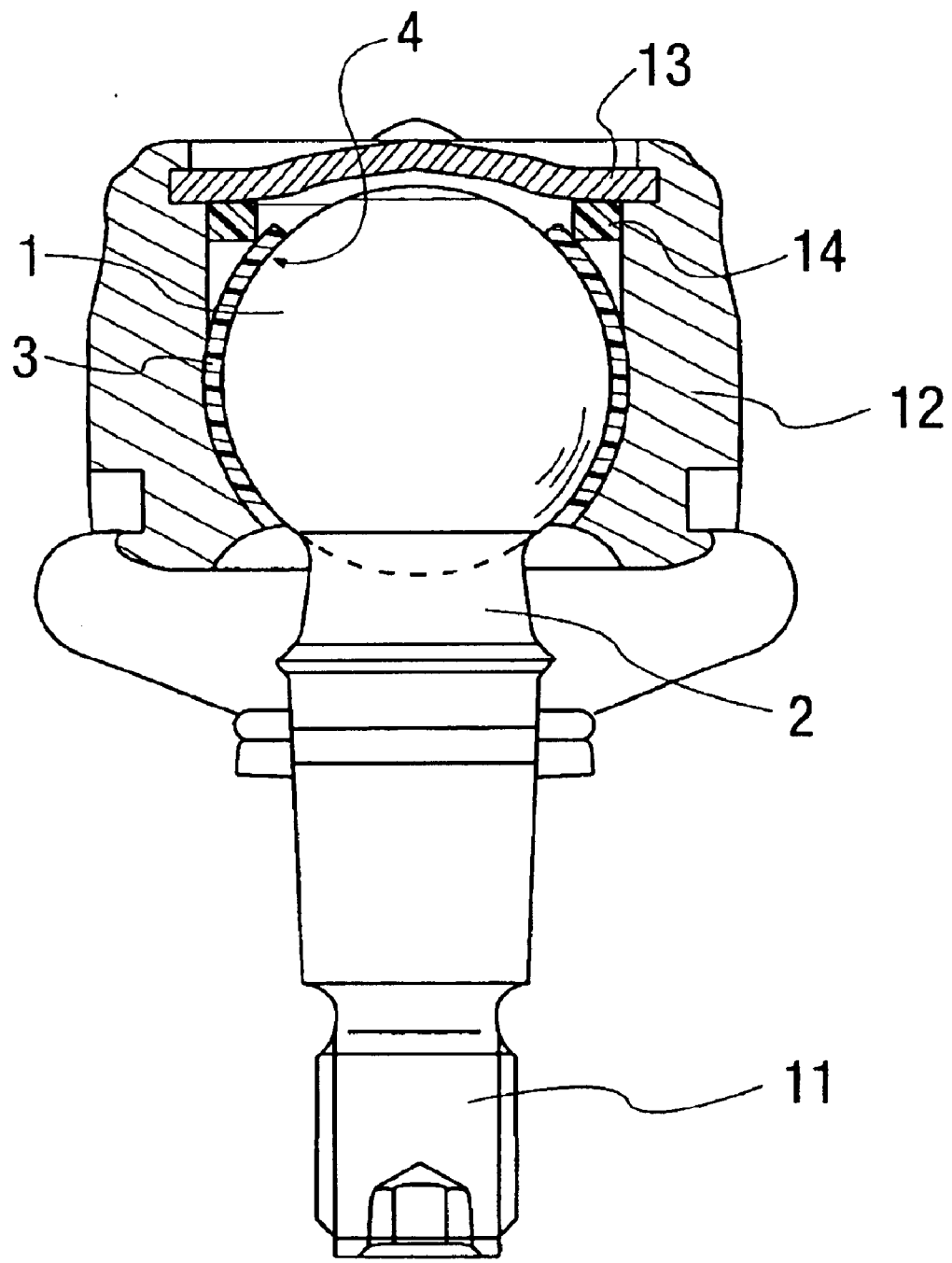
FIG. 1 is a sectional view of a ball-and-socket joint according to the present invention.

Referring to the drawings in particular, an exemplary embodiment of a ball-and-socket joint according to the present invention is shown in FIG. 1. The joint ball 1 is formed at one end of a pivot pin 2, whose other end has a threaded pin 11 for fastening. The joint ball 1 is inserted with a bearing shell 3 into a housing 12, which is closed on the open side by a cover 13. An elastic pad 14 or another elastic means ensures the clearance-free seating of the joint ball 1 in the bearing shell 3. The pivot pin 2 is thus freely movable in relation to the bearing shell 3 around three axes. An inner jacket surface 4 is located on the inside of the bearing shell. The gap between the jacket surface 4 and the outer surface of the joint ball 1 must always be provided with a thin lubricant film to reduce the frictional moments.

Figure 2:
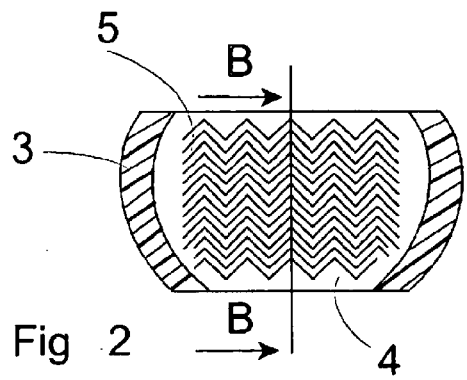
FIG. 2 is a sectional view of an exemplary embodiment of the bearing shell of the ball-and-socket joint from FIG. 1.
Figure 3:
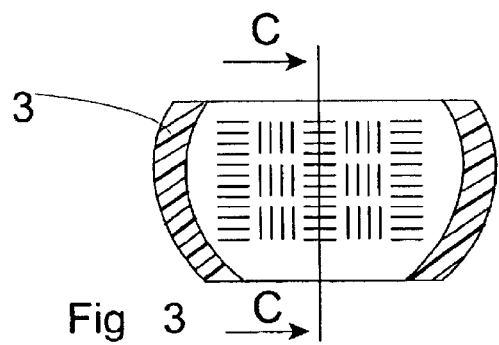
FIG. 3 is a sectional view of a second exemplary embodiment of a bearing shell of the ball-and-socket joint from FIG. 1.

To guarantee the lubricating film to a sufficient extent at any time, the bearing shell 3 has grooves 5, as is apparent from FIGS. 2 and 3, which form a structural system, distributed over the entire inner jacket surface 4 of the bearing shell 3, wherein the grooves have individual groove sections 7, whose arrangement and dimensions guarantee according to the present invention the sufficient lubricating film thickness within the gap between the joint ball 1 and the bearing shell 3.

Figure 2A:
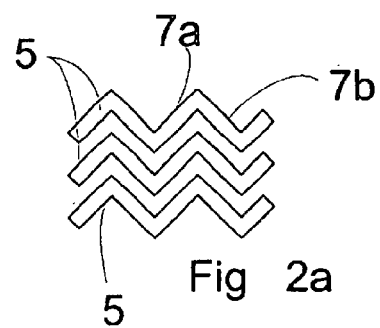
FIG. 2a is an enlarged view of the grooves of the bearing shell from FIG. 2.

In the exemplary embodiment shown in FIG. 2 and FIG. 2a, the individual grooves are divided into groove sections 7a and 7b located at right angles to one another. The groove sections 7a and 7b are connected to one another and the grooves 5 formed from the groove sections are in the form of rows arranged next to one another similarly to a tire profile. The course of the groove sections 7a and 7b is selected to be such that a transverse movement of the joint ball surface to individual groove sections 7a and 7b takes place during all pivoting movements of the joint ball 1 relative to the bearing shell 3. Due to the narrow spaces between the grooves 5, the relative movement leads to a deformation of the spaces. This deformation is facilitated by the fact that the groove depth $t$ of the grooves 5 is greater than one third of the groove width $b$ in this case.

The ratio of the groove width $b$ to the groove depth $t$ can be provided as per the examples shown in the sectional views of FIGS. 5a through 5d. The ratio of $b$ to $t$ and the short distance between the grooves 5, which appears from FIG. 2a, guarantee that a transverse movement of the joint ball 1 over the open top side of the grooves 5 leads to a deformation of the space between the grooves. This deformation of the space reduces the cross section of the grooves, the reduction in size squeezes out the lubricant contained in the grooves upward to a certain extent against the joint ball surface. Due to the movement of the joint ball 1, the lubricant squeezed out of the grooves 5 in the upward direction is drawn into the gap between the bearing shell 3 and the pivot pin 1.

Figure 3A:
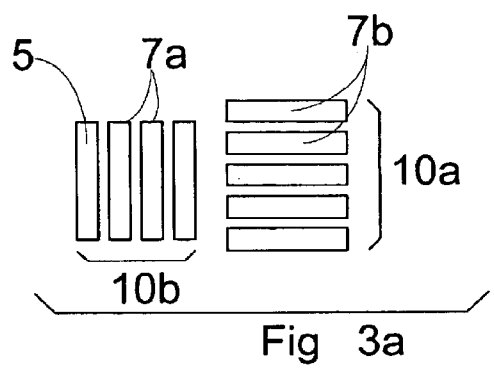
FIG. 3a is an enlarged view of the grooves of the bearing shell from FIG. 3.

FIG. 3 shows another exemplary embodiment of a structural system of grooves 5 on the inner jacket surface 4 of the bearing shell 3. It is clearly apparent from FIG. 3 and especially from FIG. 3a that the grooves 5 are divided in this embodiment of the bearing shell 3 into individual groove sections 7a and 7b, which are separated from one another, wherein the sections 7a, aligned in parallel next to one another, form a structural field 10a and the groove sections 7a establish another structural field 10b, and the longitudinal extensions of the groove sections 7a and 7b are at right angles to one another. Due to the arrangement of the groove sections 7a and 7b, a transverse movement of the joint ball surface over the opening of a groove section 7a or 7b is likewise guaranteed for each movement of the joint ball 1 relative to the bearing shell 3 analogously to FIGS. 2 and 2a. The distance between the groove sections as well as the width $b$ and the depth $t$ of the grooves 5 correspond to those of the exemplary embodiment shown in FIGS. 2 and 2a, so that a sufficient lubricating film thickness is always guaranteed in the gap between the joint ball 1 and the bearing shell 3 because of the special arrangement and the dimensions of the grooves 5 for this embodiment variant as well.

Figure 4:
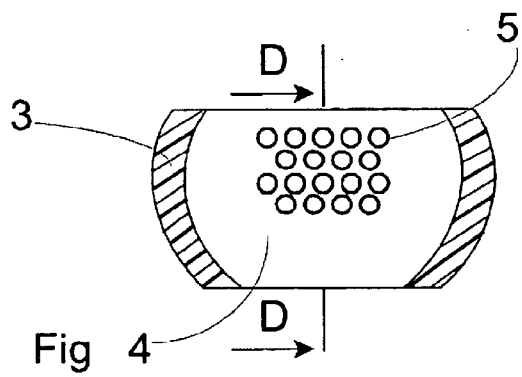
FIG. 4 is a sectional view of a third exemplary embodiment of a bearing shell of the ball-and-socket joint from FIG. 1.
Figure 4A:
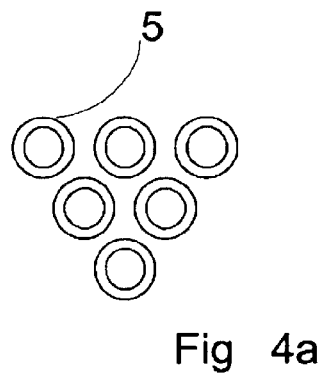
FIG. 4a is an enlarged view of the grooves of the bearing shell from FIG. 4.

A ring shape closed in itself was selected as the shape of the groove as another variant in FIGS. 4 and 4a.

Figure 5A:
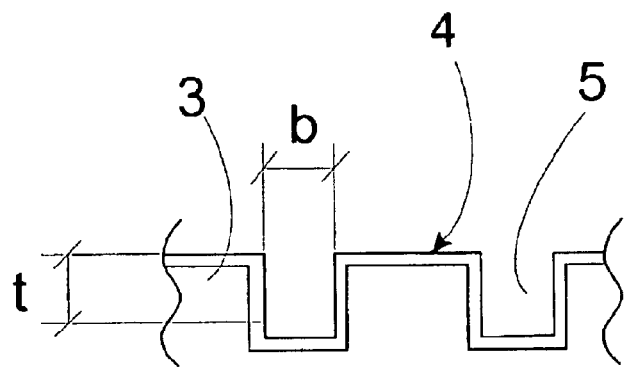
FIG. 5a is a sectional view of an embodiment of grooves corresponding to section B—B of FIG. 2.
Figure 5B:
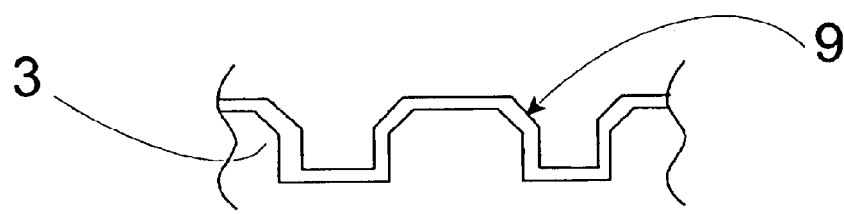
FIG. 5b is a sectional view of an embodiment of grooves corresponding to section C—C of FIG. 3.
Figure 5C:
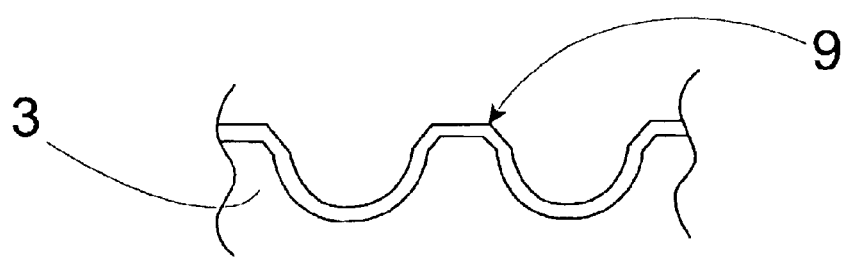
FIG. 5c is a sectional view of an embodiment of grooves corresponding to section D—D from FIG. 4.
Figure 5D:
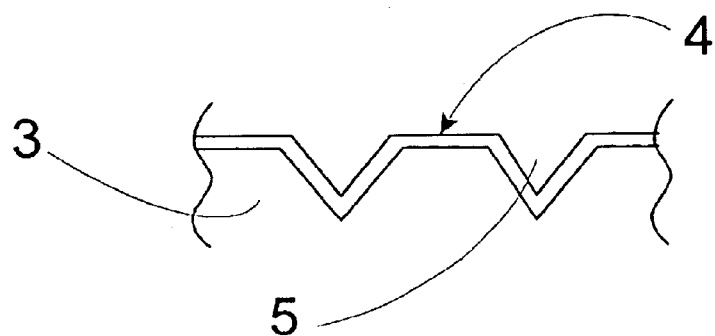
FIG. 5d is a sectional view of another embodiment of grooves corresponding to section D—D from FIG. 4.

FIGS. 5a through 5c show, besides the cross-sectional dimensions of the grooves 5, that the cross-sectional shape of the grooves 5 may vary as long as the ratio of the dimensions is maintained. Moreover, the upper longitudinal side of the groove sections 7a and 7b, respectively, which longitudinal side adjoins the inner jacket surface 4, may have a beveled edge area 9, as is shown in FIGS. 5b and 5c. The surface of the beveled edge area is inclined at an angle of essentially less than 15° to the inner jacket surface of the bearing shell.

Figure 6A:
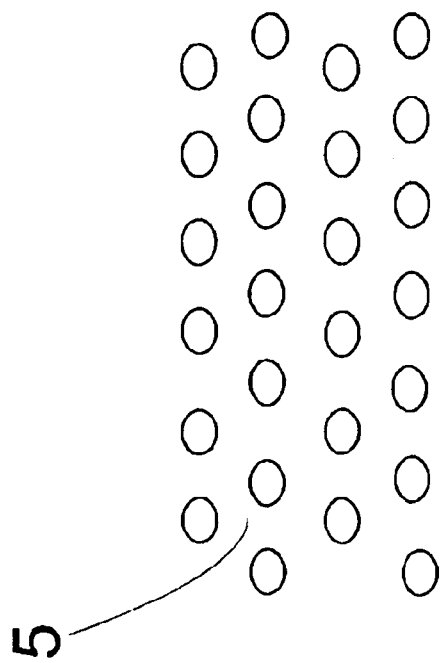
FIG. 6a an enlarged view of the bearing shell with depressions of microscopic size shown in FIG. 6.
Figure 6:
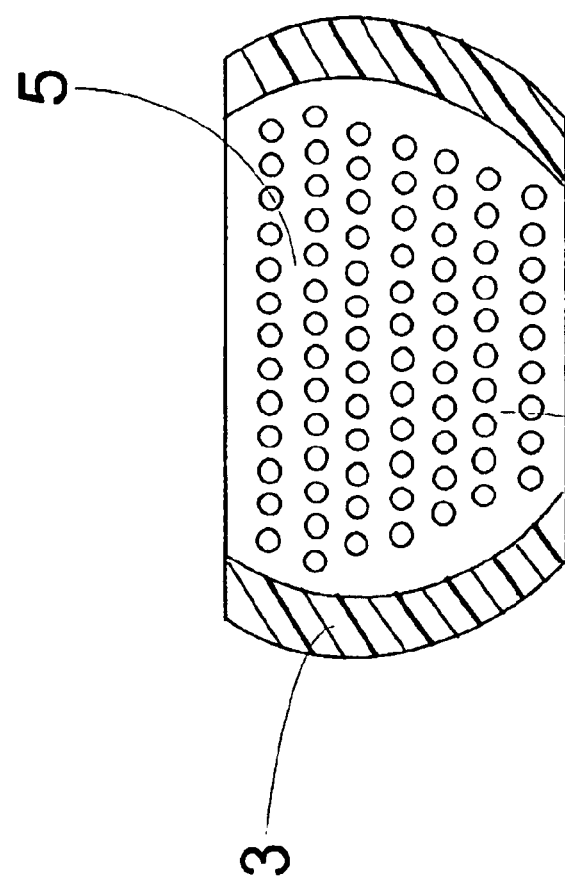
FIG. 6 is a sectional view of a bearing shell with depressions of microscopic size.

FIGS. 6 and 6a show a sectional view and enlarged view of a bearing shell 3 according to the present invention, whose recesses are depressions 5 of microscopic size. The number of these microscopic depressions 5 on the inner jacket surface 4 of the bearing shell 3 ranges from 100 to 100,000 per cm$^2$, so that a structured inner jacket surface 4 of the bearing shell is obtained, which has a porous or diffuse appearance when viewed with the naked eye. Web areas are formed between the depressions 5. The depressions 5 shown in FIGS. 6 and 6a have a spherical surface, and the edge areas 9 pass over into the web areas while forming flattened areas.

The preparation of the above-described bearing shells can be made possible by photo-optical processes for producing the structural system of the grooves and transferring according to etching or other erosion processes.

While specific embodiments of the invention have been shown and described in detail to illustrate the application of the principles of the invention, it will be understood that the invention may be embodied otherwise without departing from such principles.

What is claimed is:

1. A ball-and-socket joint for motor vehicles, the ball-and-socket joint comprising:
    a joint ball and a pivot pin;
    a housing;
    a bearing shell formed of a plastic, said bearing shell being elastic, said joint ball being mounted movably in said bearing shell, said bearing shell having recesses accommodating lubricant on an inner jacket surface of said bearing shell facing said joint ball, said housing accommodating said bearing shell and tightly surrounding said bearing shell with an inner wall, said recesses comprising groove sections with each of said groove sections limited by two side walls of substantially identical height and defining elastically deformable segments between the groove sections which deform upon movement of said joint ball relative to said bearing shell with said groove sections forming a structural system in said bearing shell with groove sections extending a length with a distance between two adjacent groove sections being up to three times a width of the respective adjacent groove sections with each groove section having a depth and said width, said depth being equal to or greater than said width.

2. A ball-and-socket joint in accordance with claim 1, wherein each of said groove sections adjoin at least one other of said groove sections with adjoining sections being arranged with their longitudinal extension essentially at right angles to one another.

3. A ball-and-socket joint in accordance with claim 1, wherein an upper longitudinal side of each of said groove sections, which said longitudinal side adjoins an inner jacket surface, has a beveled edge area.

4. A ball-and-socket joint in accordance with claim 3, wherein a surface of said beveled edge area forms an angle of essentially less than 15° with an inner jacket surface of said bearing shell.

5. A ball-and-socket joint in accordance with claim 1, wherein said groove sections are separated from one another to form individual structural fields on said jacket surface.

6. A ball-and-socket joint in accordance with claim 1, wherein said individual groove sections comprise integrated closed ring grooves.

7. A ball-and-socket joint comprising:
    a joint ball and a pivot pin;
    a housing;
    a bearing shell formed of a plastic, said bearing shell being elastic, said joint ball being mounted movably in said bearing shell, said bearing shell having recesses accommodating lubricant on its inner jacket surface facing said joint ball, said housing accommodating said bearing shell and tightly surrounding said bearing shell with an inner wall, said recesses comprising groove sections with each of said groove sections limited by two side walls of substantially identical height and defining elastically deformable segments between the groove sections which deform upon movement of said joint ball relative to said bearing shell with said groove sections forming a structural system in said bearing shell with distances between two adjacent groove sections being up to three times as large as a width of each groove section and with each groove section having a depth and said width, said depth being equal to or greater than one third of said width.

8. A ball-and-socket joint in accordance with claim 7, wherein each of said groove sections adjoin at least one other of said groove sections with adjoining sections being arranged with their longitudinal extension essentially at right angles to one another.

9. A ball-and-socket joint in accordance with claim 7, wherein an upper longitudinal side of each of said groove sections, which said longitudinal side adjoins an inner jacket surface, has a beveled edge area.

10. A ball-and-socket joint in accordance with claim 9, wherein a surface of said beveled edge area forms an angle of essentially less than 15° with an inner jacket surface of said bearing shell.

11. A ball-and-socket joint in accordance with claim 7, wherein said groove sections are separated from one another to form individual structural fields on said jacket surface.

12. A ball-and-socket joint in accordance with claim 7, wherein said individual groove sections comprise integrated closed ring grooves.

13. A ball-and-socket joint comprising:
    a joint ball and a pivot pin;
    a housing;
    a bearing shell formed of a plastic, said bearing shell being elastic, said joint ball being mounted movably in said bearing shell, said bearing shell having recesses accommodating lubricant on its inner jacket surface facing said joint ball, said housing accommodating said bearing shell and tightly surrounding said bearing shell with an inner wall, said recesses comprising depressions of microscopic size with a number of said depressions of microscopic size on the inner jacket surface of said bearing shell being between 100 and 100,000 per cm$^2$ each of said recesses having side walls of substantially identical height and defining elastically deformable bearing shell segments between the recesses which deform upon movement of said joint ball relative to said bearing shell.

14. A ball-and-socket joint in accordance with claim 13, wherein said elastically deformable bearing shell segments between the recesses are web areas.

15. A ball-and-socket joint in accordance with claim 14, wherein said depressions have a spherical surface and have flattened areas in their transition area to the web areas.

* * * * *